United States Patent Office 3,597,203
Patented Aug. 3, 1971

3,597,203
PREPARATION OF PHOTOGRAPHIC
COLOUR IMAGES
Jozef Frans Willems, Wilrijk, Belgium, assignor to
Gevaert-Agfa N.V., Mortsel, Belgium
No Drawing. Filed July 25, 1968, Ser. No. 747,432
Claims priority, application Great Britain, July 25, 1967,
34,011/67
Int. Cl. G03c 7/00, 1/76, 1/40
U.S. Cl. 96—56.5                            7 Claims

ABSTRACT OF THE DISCLOSURE

Method and materials for forming color images in exposed silver halide emulsion layers by means of a color coupling compound of the formula

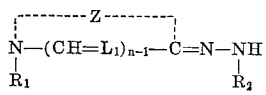

wherein:
$R_1$ represents an alkyl radical, an alkenyl radical, or an aryl radical,
Z represents the non-metallic atoms necessary to complete a 5- or 6-membered heterocyclic nucleus, or such nucleus making part of a fused heterocyclic system,
$L_1$ represents a methine group or nitrogen,
$n$ is 1 or 2, and
$R_2$ represents an acyl group or a radical of the formula —$CONH_2$ or —$SO_2X$, wherein X represents hydroxyl, an amino radical, a heterocycloc radical, an alkyl radical, an alkoxy radical, an aryloxy radical, or an aryl radical, developed with a pyrazolidine-3-one having substituted at the 1-position thereof an aryl group free of substitutions at its p-position. Both of the color coupling compound and the developing agent defined above can be provided in a photographic material in effective contact with the silver halide of a light sensitive silver halide emulsion layer.

---

The present invention relates to the formation of colour images by means of exposed light-sensitive silver halide.

As is known, the property of certain organic compounds to form a dye during the development of the exposed silver halide by coupling with the oxidized developing substance is the basis of a process for substractive colour photography. According to the common technique quinone-imine dyes and azomethine dyes are formed by coupling of the usual colourless couplers of the naphthol, pyrazolone, or ketomethylene type with an aromatic primary amino developing substance, e.g., a p-phenylenediamine derivative.

It has now been found that colour coupling with developing substances of the type and structure as described hereinafter can take place in the presence of exposed silver halide with a compound, called hereinafter colour coupler, which corresponds to the following general Formula I:

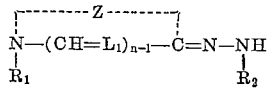

wherein:
$R_1$ represents an alkyl radical including a substituted alkyl radical, e.g. methyl, n-hexadecyl, benzyl, an alkenyl radical, e.g. allyl, an aryl radical including a substituted aryl radical, e.g. phenyl, naphthyl, and alkoxy-substituted phenyl, Z represents the non-metallic atoms necessary to complete a 5- or 6-membered heterocyclic nucleus, including such nucleus in substituted form or fused to form a fused heterocyclic system as, e.g., a benzimidazoline-, a benzoxazoline-, a 1,2 - dihydroquinoline-, a pyrimidine-, a benzothiazoline-, a 4,5,6,7 - tetrahydrobenzothiazoline or a benzisothiazoline - 1 - dioxide system including such systems in substituted form, e.g. alkyl-substituted on the nitrogen atom of the heterocyclic ring,
$L_1$ represents a methine group or a nitrogen atom,
$n$ is a positive integer from 1 to 2, and
$R_2$ represents an acyl group or a radical of the formula —$CONH_2$ or —$SO_2X$ wherein X represents a hydroxyl radical, an amino radical, including a substituted amino radical, e.g., a dialkylamino radical, a heterocyclic radical including a substituted heterocyclic radical, e.g., a N-morpholinyl radical or a N-piperidyl radical, an alkyl radical including a substituted alkyl radical, e.g. a methyl radical, a n-hexadecyl radical or a carboxylic acid-substituted alkyl radical, an alkoxy radical including a substituted alkoxy radical, an aryloxy radical including a substituted aryloxy radical, an aryl radical including a substituted aryl radical, e.g., a phenyl radical, an alkoxy-substituted phenyl radical, a carbalkoxy-substituted phenyl radical, e.g. a carbethoxy-substituted phenyl radical, an alkyl-substituted phenyl radical, e.g. tolyl, a carboxylic acid-substituted phenyl radical, a sulphonic acid-substituted phenyl radical, a sulphonic acid ester-substituted phenyl radical, a sulphamoyl-substituted phenyl radical, a halogen-substituted phenyl radical, e.g. a 2,5-dichlorophenyl radical, or an acylamino-substituted phenyl radical.

Representatives falling under the above general Formult I as well as their preparation are described in the U.K. patent specification 975,932.

Developing substances, which are effective for the purpose of the present invention, belong to the following classes A, B, C and D. Developing compounds of class A are pyrazolidin-3-ones substituted in the 1-position with an aryl group the p-position of which is left unsubstituted. Preferred representatives of that class correspond to the following general Formula II:

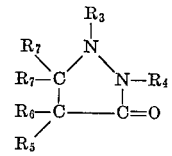

wherein:
$R_3$ represents an aryl radical including a substituted aryl radical being, however, not substituted in the p-position.
$R_4$ represents a hydrogen atom or an acyl radical, e.g., an acetyl radical, and
each of $R_5$, $R_6$, $R_7$ and $R_8$ (the same or different) represents a hydrogen atom, an alkyl radical, a substituted alkyl radical, an aryl radical or a substituted aryl radical.

Good results are obtained with the following compounds corresponding to the above formula:

1-phenyl-pyrazolidin-3-one
1-(m-tolyl)-pyrazolidin-3-one
1-phenyl-2-acetyl-pyrazolidin-3-one
1-phenyl-4-methyl-pyrazolidin-3-one
1-phenyl-5-methyl-pyrazolidin-3-one
1-phenyl-4,4-dimethyl-pyrazolidin-3-one
1-phenyl-5,5-dimethyl-pyrazolidin-3-one
1,5-diphenyl-3-pyrazolidin-3-one
1-(m-tolyl)-5-phenyl-pyrazolidin-5-one Developing substances of class B are p-aminophenol compounds of which at least one of the o-positions in respect of the hydroxyl group is unsubstituted, and of which suitable representatives correspond to the following general Formula III:

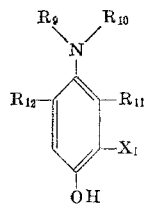

wherein:

$R_9$ is a hydrogen atom, an alkyl radical including a substituted alkyl radical, $R_{12}$ represents a hydrogen atom, or $R_{12}$ together with $R_9$ represents an alkylene radical or a substituted alkylene radical to close a fused 5- or 6-membered nucleus, $R_{10}$ represents a hydrogen atom, an alkyl radical including a substituted alkyl radical, or $R_9$ and $R_{10}$ together with the nitrogen atom to which they are joined constitute a pyrrolidine nucleus or piperidine nucleus, $R_{11}$ represents a hydrogen atom, or $R_{11}$ together with $R_{10}$ represents an alkylene radical or a substituted alkylene radical to close a fused 5- or 6-membered nucleus, and $X_1$ represents a hydrogen atom, a halogen atom, e.g. a chlorine atom, or an electron-donating group, e.g. an alkyl group, an alkoxy group, an amino group, a substituted amino group, e.g. a monoalkylamino- or dialkylamino group, or an acylamino group derived from a carboxylic or sulphonic acid.

Representatives falling under the scope of the above general Formula III and their preparation are described in the U.K. patent specification 928,671 and 1,003,783.

Developing substances of class C are p-phenylenediamine derivatives of which at least one of the o-positions in respect of the —NH₂ group is unsubstituted.

Suitable representatives correspond to the following general Formula IV:

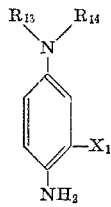

wherein:

$R_{13}$ represents a hydrogen atom, an alkyl radical including a substituted alkyl radical, or $R_{13}$ together with $R_{14}$ represents the necessary atoms to close a pyrrolidine nucleus or piperidine nucleus, or $R_{14}$ represents an alkylene group forming a fused 5- or 6-membered nucleus when linked to a carbon atom in o-position to the $R_{13}$-substituted nitrogen atom, and $X_1$ has the same significance as set forth hereinbefore.

Representatives falling under the scope of the above general Formula IV as well as their preparation are described in the U.K. patent specification 989,383.

Developing substances of class D are o-aminophenol derivatives of which the o-position in respect of the hydroxyl group being the m-position in respect of the amino group, is unsubstituted.

Representatives of that class contain the following structure V:

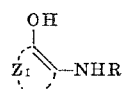

wherein:

$Z_1$ represents the necessary atoms to form an aromatic nucleus e.g. benzene nucleus or fused aromatic nucleus, e.g. naphthalene nucleus which nuclei are unsubstituted in at least the o- or p-position in respect of the hydroxyl group, and R represents an alkyl group including a substituted alkyl group, or an alkylene group forming a fused 5- or 6-membered nucleus with the carbon atom in o-position in respect of the —NHR group.

The alkyl radicals in the compounds II, III, IV and V are preferably lower alkyl groups i.e. $C_1$–$C_4$ alkyl groups and are when substituted preferably substituted with hydroxyl, carboxyl, sulpho or halogen, e.g. chlorine.

The colour couplers used according to the present invention may be incorporated into a light-sensitive silver halide emulsion layer without fogging the latter. Preferably said couplers contain in their structure a so-called "ballasting group" making these compounds resistant to diffusion in hydrophilic photographic colloid layers. Such a group is preferably an aliphatic radical containing at least 5 and preferably from 5 to 20 carbon atoms in straight line. Such a ballasting group is, e.g., represented by $R_1$ being in that case a $C_5$–$C_{20}$ alkyl radical or a $C_5$–$C_{20}$ alkyl radical making part of a group as defined for $R_2$ or $R_1$.

The colour couplers used according to the present invention may be added to the light-sensitive silver halide composition in dissolved or finely dispersed state either or not with the aid of high boiling solvents. For suited techniques for the incorporation of photographic ingredients into colloid compositions reference is made to the published Dutch patent applications 6600098, 6600099, 6516424, 6600628 and 6516423, and to Belgian patent specification 705,889.

The developing substances used according to the present invention may be added to the developing bath in base or salt form. A preferred concentration of developing agent is in the range of 0.3 g. to 5 g. per litre.

The developing substances producing less or no fog when incorporated into the light-sensitive material are preferred since then the development can take place with a so-called "activating solution," which is an aqueous solution having a pH above 7. The developing substances according to the general Formula II are suited for that purpose.

The developing substances according to the general Formulae II–V may be combined with each other for producing black or grey dyestuff mixtures enhancing the total grey density of the developed silver image. For the purposes of enhancing the developing rate of the exposed silver halide the developing substances used according to the present invention may be mixed to a minor extent with a non-colour-forming developing substance, e.g. hydroquinone, provided that no noticeable decrease in yield of dye takes place.

The colour formation according to the present invention can be combined with the classical azomethine and quinone-imine dye formation, e.g. a p-phenylenediamine developing substance can be allowed to couple competitively with the colour couplers of the present invention in the presence of classical naphthol-, pyrazolone and/or ketomethylene coupling compounds.

It is also possible to produce a reversal colour image by the steps of (a) developing the exposed areas of a silver halide emulsion layer with a non-coupling black-and-white developer (e.g. hydroquinone, (b) fogging unexposed silver halide left and (c) developing the latter in the presence of a colour coupler according to the general Formula I with a developing substance suited for coupling as described above. The colour coupling reaction described in the present invention is suited for forming a colour image of opposite gradation to the colour image obtained in the image-wise exposed parts of a light-sensitive silver halide colour material. In other words, after the colour development the silver halide emulsion layer can be non-differentially exposed and the exposed silver halide developed according to the present invention. This procedure may form the basis of the colour correction of colour negatives known as integral masking. A discussion of integral masking and its advantages can be found in Photo-Technik und Wirtschaft Nr. 8 (1966), pp. 348–350.

A further interesting use of the method according to the present invention resides in the economy of silver. Together with the developed silver the dyes built up an image so that the total optical density is increased. Indeed, by the colour development the dye image produced covers the silver image so that with less silver halide an image with acceptable density and gradation is obtained. An economy of silver is of particular interest in the manufacture of X-ray emulsions which have a rather high silver halide content.

The following examples illustrate the present invention without however limiting it thereto.

EXAMPLE 1

To a kg. of a silver bromide-iodide emulsion (3 mole percent of iodide) of the positive fine-grain type and containing 0.29 mole of silver halide were added 20 g. of a colour coupler having the following structural formula:

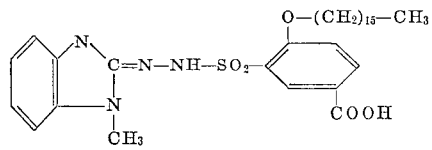

After the addition of the usual emulsion additives such as hardening and wetting agents the silver halide emulsion was coated onto a cellulose triacetate support.

The obtained light-sensitive material was exposed and develoved for 7 min. at 20° C. in a developer of the following composition:

|  | G. |
| --- | --- |
| Anhydrous sodium carbonate | 50 |
| Anhydrous sodium sulphite | 2 |
| Potassium bromide | 0.5 |

A developing agent of the following structural formula:

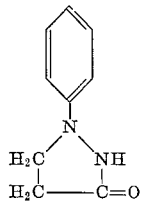

After bleaching the silver, fixing and rinsing, a purple dye image was obtained.

EXAMPLE 2

Example 1 was repeated with the difference however, that the developing agent was replaced by a same amount of a developing agent with the following structural formula:

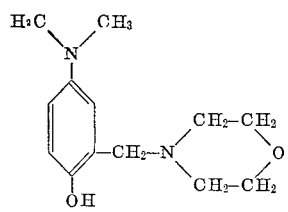

A green dye image was obtained.

EXAMPLE 3

Example 1 was repeated with the difference, however, that the developing agent was replaced by a same amount of a developing agent corresponding to the following general formula:

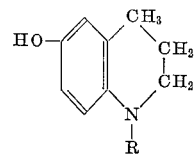

wherein R is:
—$(CH_2)_3SO_2NH_2$
—$(CH_2)_2NHSO_2CH_3$, —$(CH_2)_4SO_3H$ or
—$(CH)_2$—OH With any of the developing agents a green dye image was obtained.

EXAMPLE 4

Example 1 was repeated with the difference, however, that the developing agent was replaced by a same amount of a developing agent corresponding to the following structural formula:

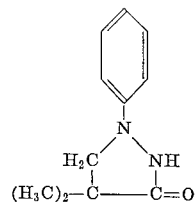

A purple dye image was obtained.

EXAMPLE 5

Example 1 was repeated with the difference, however, that the developing agent was replaced by a same amount of a developing agent corresponding to the following structural formula:

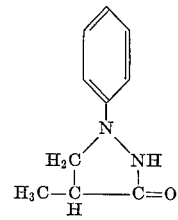

A purple dye image was obtained.

EXAMPLE 6

Example 1 was repeated with the difference, however, that the developing agent was replaced by a same amount of a developing agent corresponding to the following structural formula:

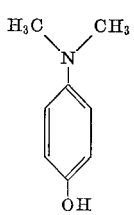

A green dye image was obtained.

EXAMPLE 7

Example 1 was repeated with the difference, however, that the developing agent was replaced by a same amount of a developing agent corresponding to the following structural formula:

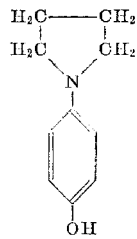

A green dye image was obtained.

EXAMPLE 8

Example 1 was repeated with the difference, however, that the developing agent was replaced by a same amount of a developing agent corresponding to the following structural formula:

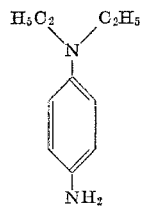

A yellow dye image was obtained.

EXAMPLE 9

Example 1 was repeated with the difference, however, that the developing agent was replaced by a same amount of a developing agent corresponding to the following structural formula:

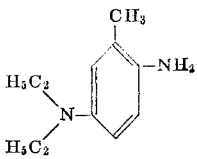

A yellow dye image was obtained.

EXAMPLE 10

Example 1 was repeated with the difference, however, that the developing agent was replaced by a same amount of a developing agent corresponding to the following structural formula:

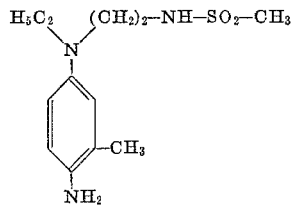

A yellow dye image was obtained.

EXAMPLE 11

Example 1 was repeated with the difference, however, that the developing agent was replaced by a same amount of a developing agent corresponding to the following structural formula:

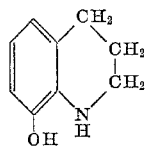

A red dye image was obtained.

EXAMPLE 12

Example 1 was repeated with the difference, however, that the developing agent was replaced by a same amount of a developing agent corresponding to the following structural formula:

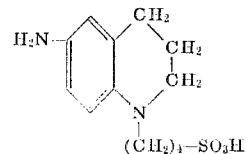

A yellow dye image was obtained.

EXAMPLE 13

Example 1 was repeated with the difference, however, that the colour coupler was replaced by a same amount of a colour coupler having the following structural formula:

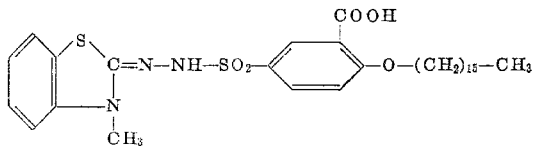

A purple dye image was obtained.

EXAMPLE 14

Example 1 was repeated with the difference, however, that the colour coupler was replaced by a same amount of a colour coupler having the following structural formula:

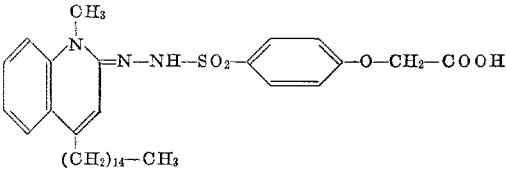

A purple dye image was obtained.

EXAMPLE 15

Example 1 was repeated with the difference, however, that the colour coupler was replaced by a same amount of a colour coupler having the following structural formula:

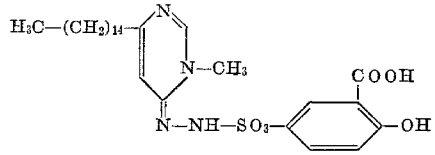

A purple dye image was obtained.

EXAMPLE 16

A silver bromide emulsion suited for X-ray recording and containing 130 g. of silver bromide per kg. of emulsion was coated onto a cellulose triacetate base. The obtained light-sensitive material, called hereinafter material A, was compared under the same exposure conditions with (a) a light sensitive material B having an emulsion layer as thick as that of material A but having only half of the silver bromide of material A and containing per kg. 20 g. of the colour coupler defined in Example 1.

(b) a light-sensitive material C having an emulsion layer as thick as that of material A but having only a quarter of the silver bromide of material A and containing per kg. 20 g. of the colour coupler defined in Example 1.

Material A was developed for 8 min. at 20° C. in a developing solution of the following composition:

|  | G. |
|---|---|
| Hydroquinone | 10 |
| 1-phenyl-pyrazolidin-3-one | 0.5 |
| Anhydrous sodium sulphite | 60 |
| Anhydrous sodium carbonate | 50 |
| Potassium bromide | 3 |
| Water up till 1000 ccs. | |

The materials B and C were developed under the same conditions in a developing solution of the following composition:

| | G. |
|---|---|
| 1-phenyl-pyrazolidin-3-one | 2 |
| Anhydrous sodium sulphite | 60 |
| Anhydrous sodium carbonate | 50 |
| Potassium bromide | 3 |
| Water up till 100 ccs. | |

The sensitometric results are listed in the following table. The maximum density obtained in the materials B and C was measured behind three filters, viz a yellow, magenta and cyan filter.

The maximum density D of the image in material A is a so-called "black-and-white" density. The sensitivity (S) is expressed in log exposure values and a decrease of 0.30 means a doubling in sensitivity.

| | Measured behind yellow filter | | | Measured behind a magenta filter | | | Measured behind a cyan filter | | |
|---|---|---|---|---|---|---|---|---|---|
| | Fog | S | D | Fog | S | D | Fog | S | D |
| Material B | 0.19 | 11.8 | 1.75 | 0.13 | 14.3 | 0.75 | 0.09 | 14.7 | 0.58 |
| Marerial C | 0.18 | 10.7 | 1.14 | 0.12 | 14.3 | 0.46 | 0.09 | 15.1 | 0.31 |

| "Black-and-white" sensitometry | | |
|---|---|---|
| Fog | S | D |
| Material A ...... 0.17 | 11.8 | 0.98 |

I claim:

1. Method for the preparation of photographic images by colour development of an image-wise exposed silver halide emulsion layer, wherein the development of the silver halide is carried out in the presence of (1) a colour coupler corresponding to the following general Formula I

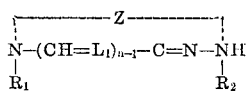

wherein:
$R_1$ represents an alkyl radical, an alkenyl radical, or an aryl radical,
Z represents the non-metallic atoms necessary to complete a 5- or 6-member heterocyclic nucleus, or such nucleus making part of a fused heterocyclic system,
$L_1$ represents a methine group or nitrogen,
$n$ is 1 or 2, and
$R_2$ represents an acyl group or a radical of the formula —$COHN_2$ or —$SO_2X$, wherein X represents hydroxyl, an amino radical, a heterocyclic radical, an alkyl radical, an alkoxy radical, an aryloxy radical, or an aryl radical, and (2) by means of at least one developing agent which is a pyrazolidine-3-one substituted in the 1-position by an aryl group having its p-position unsubstituted.

2. Method for the preparation of photographic images according to claim 1, wherein the developing substance corresponds to the general formula:

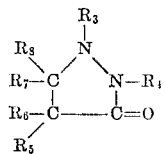

wherein:
$R_3$ represents an aryl radical being unsubstituted in the p-position,
$R_4$ represents hydrogen or an acyl radical, and
each of $R_5$, $R_6$, $R_7$ and $R_8$ represents hydrogen, an alkyl radical, or an aryl radical.

3. Method for the preparation of photographic images according to claim 1, wherein the colour coupler is present in the silver halide emulsion layer in a form resisting diffusion from said emulsion layer.

4. Method for the preparation of photographic images according to claim 3, wherein the developing agent used is 1-phenyl-pyrazolidin-3-one.

5. Method for the preparation of photographic images according to claim 1, wherein Z represents the necessary atoms to form a benzothiazoline nucleus.

6. A method for the preparation of photographic images by colour development according to claim 1, wherein the photographic material contains the developing agent and the development is carried out with the aid of an alkaline activating solution.

7. A photographic material containing a light-sensitive silver halide emulsion layer and in effective contact with said silver halide a colour coupler corresponding to the following general formula:

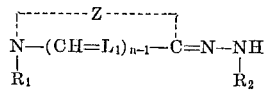

wherein:
$R_1$ represents an alkyl radical, an alkenyl radical, or an aryl radical,
Z represents the non-metallic atoms necessary to complete a 5- or 6-membered heterocyclic nucleus, including such nucleus in substituted form or fused to form a fused heterocyclic system,
$L_1$ represents a methine group or nitrogen,
$n$ is 1 or 2, and
$R_2$ represents an acyl group or a group of the formula —$CONH_2$ or —$SO_2X$, wherein X represents hydroxyl, an aryloxy radical or an aryl radical, and
an aryloxy radial or an aryl radical, and
a developing agent according to the following general formula:

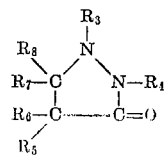

wherein:
$R_3$ represents an aryl radical free of substitution in its p-position,
$R_4$ represents hydrogen or an acyl radical, and
each of $R_5$, $R_6$, $R_7$ and $R_8$ represents hydrogen, an alkyl radical or an aryl radical.

References Cited

FOREIGN PATENTS

| 928,671 | 6/1963 | Great Britain. |
| 989,383 | 3/1965 | Great Britain. |
| 975,932 | 11/1964 | Great Britain. |
| 1,003,783 | 9/1965 | Great Britain. |
| 1,039,453 | 8/1966 | Great Britain. |

J. TRAVIS BROWN, Primary Examiner

E. C. KIMLIN, Assistant Examiner

U.S. Cl. X.R.

96—74, 100